(12) United States Patent
Lane et al.

(10) Patent No.: US 8,075,656 B2
(45) Date of Patent: Dec. 13, 2011

(54) SEPARATOR ASSEMBLY

(75) Inventors: Brian Lane, Hebburn (GB); Stephen Bittle, Ponteland (GB); Ray Trowsdale, Consett (GB)

(73) Assignee: Parker Hannifin Limited, Parker House, Hemel Hempstead (GB)

( * ) Notice: Subject to any disclaimer, the term of this patent is extended or adjusted under 35 U.S.C. 154(b) by 217 days.

(21) Appl. No.: 11/972,915

(22) Filed: Jan. 11, 2008

(65) Prior Publication Data

US 2008/0115469 A1 May 22, 2008

Related U.S. Application Data

(63) Continuation of application No. PCT/GB2006/002737, filed on Jul. 21, 2006.

(30) Foreign Application Priority Data

Jul. 26, 2005 (GB) .................................. 0515264.0
Nov. 28, 2005 (GB) .................................. 0524173.2

(51) Int. Cl.
*B01D 45/14* (2006.01)
(52) U.S. Cl. ................ 55/426; 55/447; 55/456; 55/457; 55/462; 55/DIG. 17; 95/269; 210/512.1
(58) Field of Classification Search ..................... 55/320, 55/337, 413, 424, 425, 426, 447, 456, 457, 55/392, 394, 462, DIG. 17; 95/269
See application file for complete search history.

(56) References Cited

U.S. PATENT DOCUMENTS

| 1,906,432 | A | | 5/1933 | Summers | |
|---|---|---|---|---|---|
| 2,222,930 | A | * | 11/1940 | Arnold | ........................... 55/339 |
| 2,425,588 | A | * | 8/1947 | Alexander | ..................... 55/398 |
| 2,801,751 | A | | 8/1957 | Thomas | |
| 2,894,600 | A | * | 7/1959 | Veres | ............................... 55/335 |
| 3,257,783 | A | * | 6/1966 | Baker et al. | .................... 96/409 |

(Continued)

FOREIGN PATENT DOCUMENTS

DE 103 19 134 A1 6/2004
(Continued)

OTHER PUBLICATIONS

Corresponding Search Report from the United Kingdom Patent Office dated Oct. 26, 2005.
(Continued)

*Primary Examiner* — Robert Clemente
(74) *Attorney, Agent, or Firm* — Christopher H. Hunter

(57) ABSTRACT

A separator assembly for removing material that is entrained in a gas stream. The separator assembly comprises a housing having inlet and outlet ports for the gas from which material is to be removed. The inlet and outlet ports are located toward the upper end of the housing. A flow director is positioned so that gas flowing into the housing flows over the flow director so that the incoming gas is made to follow a generally helical path within the housing. The separator assembly also comprises a shield which extends across the housing towards the lower end thereof so as to leave a collection space between it and the lower end in which material that is separated from the gas stream can collect. There is at least one opening in or around the shield through which the material can flow past the shield into the collection space. The face of the shield which is directed towards the upper end of the housing is bowl-shaped.

18 Claims, 5 Drawing Sheets

U.S. PATENT DOCUMENTS

| | | | |
|---|---|---|---|
| 3,378,993 A * | 4/1968 | Veres et al. | 96/409 |
| 3,590,558 A | 7/1971 | Fernandes | |
| 3,802,570 A | 4/1974 | Dehne | |
| 3,845,840 A * | 11/1974 | Thrasher | 181/230 |
| 4,516,994 A | 5/1985 | Kocher | |
| 4,668,256 A * | 5/1987 | Billiet et al. | 96/409 |
| 4,838,434 A | 6/1989 | Miller | |
| 5,391,294 A | 2/1995 | Mercier et al. | |
| 5,746,791 A * | 5/1998 | Wang | 55/337 |
| 6,221,134 B1 * | 4/2001 | Conrad et al. | 95/271 |
| 6,228,260 B1 * | 5/2001 | Conrad et al. | 210/304 |
| 6,231,645 B1 * | 5/2001 | Conrad et al. | 95/271 |
| 6,251,296 B1 | 6/2001 | Conrad | |
| 6,416,563 B1 | 7/2002 | Wright et al. | |
| 6,440,197 B1 * | 8/2002 | Conrad et al. | 95/271 |
| 6,596,047 B2 * | 7/2003 | Oh | 55/426 |
| 7,449,040 B2 * | 11/2008 | Conrad et al. | 55/426 |
| 7,537,624 B2 * | 5/2009 | Jachmann | 55/337 |

FOREIGN PATENT DOCUMENTS

| | | |
|---|---|---|
| FR | 2 205 369 A | 5/1974 |
| GB | 2 110 562 A | 6/1983 |
| GB | 2 177 951 A | 2/1987 |
| JP | 07332302 A | 12/1995 |
| SU | 1721296 A1 | 3/1991 |
| WO | 03/030702 A2 | 4/2003 |
| WO | 03/033106 A1 | 4/2003 |
| WO | 2005/023396 A1 | 3/2005 |
| WO | 2006/013331 A1 | 2/2006 |
| WO | 2006/013333 A1 | 2/2006 |

OTHER PUBLICATIONS

Notification of Transmittal of the International Search Report and the Written Opinion of the International Searching Authority, or the Declaration dated Apr. 9, 2006 in corresponding International Application No. PCT/GB2006/002737.

Search Report from the United Kingdom Patent Office dated Oct. 27, 2005 filed in related U.S. Appl. No. 11/972,738, entitled Separator Assembly.

International Search Report in International Application No. PCT/GB2006/002727. dated Feb. 6, 2007, filed in related U.S. Appl. No. 11/972,738, entitled Separator Assembly.

Notification of The International Preliminary Report on Patentability in International Application No. PCT/GB2006/002727, dated Nov. 15, 2007, filed in related U.S. Appl. No. 11/972,738 entitled Separator Assembly.

Office Action mailed Oct. 29, 2009 and Amendment in response filed Feb. 15, 2010 in related U.S. Appl. No. 11/972,738 entitled Separator Assembly.

Related U.S. Appl. No. 11/972,738, filed Jan. 11, 2008 entitled: SEPARATOR ASSEMBLY.

* cited by examiner

SEPARATOR ASSEMBLY

CROSS REFERENCE TO RELATED APPLICATIONS

This application is continuation of copending International Application No. PCT/GB06/002737 filed Jul. 21, 2006, which designated the United States, the disclosure of which is incorporated herein by reference, and which claims priority to Great Britain Patent Application Nos. 0524173.2, filed Nov. 28, 2005; and 0515264.0, filed. Jul. 26,2005.

BACKGROUND OF THE INVENTION

The present invention relates to a separator assembly for removing material that is entrained in a gas stream such as liquid in an aerosol form.

SUMMARY OF THE INVENTION

Removal of material from a gas stream can be required to ensure that the gas is sufficiently clean for a subsequent application, or to minimise adverse effects of impurities on components of the system. For example, removal of compressor oil can be required to minimise chemical contamination and accumulation on valves which might lead to malfunction of the valves, and removal of particulate solid material can be required to minimise abrasion. Also, removal of liquid such as water droplets from a gas stream can be required in order to minimise contaminant loading in downstream filters.

Separator assemblies for use in a compressed gas systems which are designed to remove material from a gas stream prior to a downstream application are known. Such separator assemblies include water separators which utilise centrifugal forces caused by a helically flowing gas stream to separate bulk liquid, such as water, from the gas stream. Such water separator assemblies generally comprise a housing having inlet and outlet ports at an upper end of the housing for the gas stream that is to be filtered, a plurality of baffles arranged to impart a helical flow to gas entering the housing, and a shield located between the inlet and outlet ports and an reservoir area at the lower end of the housing at which separated material collects. A liquid drainage port can be provided at the lower end of the housing through which liquid can be removed from the housing. The shield is typically a flat plate and is suspended within the housing by a tie rod extending from the top end of the housing. A gas stream enters the housing through the inlet port. Liquid separated from the gas stream falls to the bottom of the housing where it gathers at the lower end of the housing. The shield acts to quell the turbulent air flow so as to create a "quiet space" between itself and the lower end. This quiet space helps to prevent liquid becoming re-entrained in the gas stream. Also, when a drainage port is present, the quiet space can allow the drainage port to function properly.

It can be important to minimise the pressure drop across a separator assembly. Typically, the higher the pressure drop across a separator assembly in a compressed gas system, the lower the efficiency of the system and the higher the operating costs of the system.

Accordingly, in one aspect, the invention provides a separator assembly for removing material that is entrained in a gas stream comprising: a housing having inlet and outlet ports for the gas from which material is to be removed, the inlet and outlet ports being located toward the upper end of the housing, and having a first flow director positioned so that gas flowing into the housing flows over the flow director so that the incoming gas is made to follow a generally helical path within the housing; and a shield which extends across the housing towards the lower end thereof so as to leave a collection space between it and the lower end in which material that is separated from the gas stream can collect, with at least one opening in or around the shield through which the material can flow past the shield into the collection space, in which the face of the shield which is directed towards the upper end of the housing is bowl-shaped.

The assembly of the invention has the advantage that the bowl-shaped face of the shield can help to accelerate the helical flow of gas and to direct it back toward the outlet port. This is in contrast to known flat shields which causes the helical flow of gas to rebound back toward the outlet port in a random, and subsequently inefficient, manner. By maintaining the helical flow and directing it back toward the outlet port in a uniform manner, it has been found that the pressure drop across a separator assembly according to the present invention can be less than that across current separator assemblies. Further, by accelerating the helical flow of gas, it has been found that the separating properties of the separator assembly is improved.

Surprisingly, it has been found that material does not collect in the shield even though the face of the shield that faces towards the upper end of the housing is bowl-shaped. This is because the bowl-shaped face maintains the helical flow of the gas as it flows over the bowl-shaped face, and so material on the bowl-shaped face is forced outwards towards the wall of the housing as a result of centrifugal forces.

The shield can be made from polymeric materials or from metallic materials. It should have sufficient rigidity to ensure that the shield does not flex or move during operation. Suitable materials should not have any adverse reaction with fluids with which the element will come into contact when in use.

Preferably, the shield is solid in that there are no perforations over the bulk of the surface of the shield.

A generally helical path is any path which extends around an axis so that material entrained in a gas is forced outward away from the axis, toward the wall of the housing, as a result of centrifugal forces. It is not necessarily that the helical path is a perfect helix. For example, the distance between the helical path of the gas stream and the wall of the housing could increase or decrease as the gas stream flows around the housing axis. For example, the helix spiral shaped so that the helical path tightens towards its leading or trailing end. Further, the angle of the gas stream to a plane perpendicular to the axis about which it flows could increase or decrease along the axis.

It can be preferable that the internal side wall of the housing is roughened. This is because liquid will tend to cling to a smooth surface due to surface tension, and therefore not readily fall down the internal side wall past the shield to the quiet space. This can cause problems with the liquid becoming re-entrained within the case stream. Preferably, the texture of the surface of the internal side wall of the housing between the shield and the upper end of the housing is rough. Roughened surfaces have been found to reduce the liquid to collect due to surface tension effects. Therefore, the liquid tends to fall down the internal side wall's surface more readily, reducing the chance of the liquid becoming re-entrained in the gas stream. The rough texture can be created as a result of moulding with an appropriately roughened surface. When the mould is made from metal, rough surfaces can be made by spark erosion or similar techniques.

A shield wall can be provided, extending around the perimeter of the shield on its face which is directed toward the upper end of the housing. Preferably, the wall extends around the entire perimeter of the shield. Preferably, the wall is shaped and sized so that it is a snug fit within the housing. The housing can comprise head and body parts as described in more detail below. Preferably, the wall extends from the face of the shield which is directed toward the upper end of the housing to a point proximal the upper end of the body part.

Preferably, the shield wall is approximately round, especially approximately circular, in shape when viewed from above. This can help to minimise disturbance of the flow of gas due to discontinuities in the path defined by the shield wall. It has been found that a circular shield wall can help to maintain the helical flow of gas, thereby maintaining the separating property of helical flow of gas caused by centrifugal force. Further, a circular shaped shield wall can provide less resistance to a helical gas stream flowing within it. As a result, it has been found that the pressure drop experienced across the separator assembly is less with a circular shield wall.

It can be preferable that the surface of the inner side wall of the shield wall, that is the side of the shield wall that does not face the internal side wall of the housing, is roughened. This is because liquid will tend to cling to a smooth surface due to surface tension, and therefore not readily fall down the surface of the inner side wall of the shield, past the shield into the quiet space. This can cause problems with the liquid becoming re-entrained within the case stream. Preferably, the texture of the surface of the inner side wall of the shield wall is rough. Roughened surfaces have been found to reduce the liquid to collect due to surface tension effects. It can be preferable to provide a shield wall having a rough inner side surface rather than providing a housing body having a rough internal side wall surface, because the housing body will typically be made from materials in which it can be difficult to form a rough surface. In contrast, the shield wall can be made from different materials in which it can be easier to form a rough surface. For example, the housing body will typically be made from metallic materials, whereas the shield will typically be made from polymeric materials. The rough texture can be created as a result of moulding with an appropriately roughened surface. When the mould is made from metal, rough surfaces can be made by spark erosion or similar techniques.

Preferably, the shield and the shield wall are provided as one piece. For example, the shield and the shield wall can be provided as a single moulded piece. Optionally, the shield and the shield wall can be formed as separate pieces that have been fastened together.

The shield can be located within the body part of the housing against forces in a direction towards the lower end of the housing as a result of the action against it by the gas stream through engagement between the shield wall and the internal side wall of the housing.

The opening can be a gap between the shield and the housing. The gap can exist as a result of a difference in at least one of the shape and size of the shield and housing. The gap can exists due to the spacing of the perimeter of the shield from the side wall of the housing. The perimeter of the shield is defined by the edge of the shield that is closest to the upper end of the housing when the shield is located within the housing. The gap can extend only part way around the shield. The gap can extend annularly around the shield. When the shield is be located within the body part of the housing through engagement between a plurality of ribs that extend away from its perimeter toward the internal side wall of the housing and the side wall of the housing, then the openings can be defined by the gap between the shield, ribs and the internal side wall.

When a shield wall is provided, then preferably the opening is provided in the shield. Preferably, the opening is provided towards its perimeter where the shield wall meets the shield.

When the shape and size of the shield and the housing are such that the shield is a sung fit within the housing so that there is little or no gap between the perimeter of the shield and the housing side wall, then preferably the opening is provided in the shield. When the opening is in the shield, preferably the opening is located toward the perimeter of the shield. The shape of the opening can be any regular or irregular shape. For example, the opening can be circular or square in shape. Preferably, the shape of the opening follows the shape of the perimeter of the shield. For example, if the shape of the perimeter of the shield is curved, preferably the shape of the opening is curved. Preferably the opening is located toward the perimeter of the shield. The closer the opening is toward the perimeter of the shield, the less disturbance caused to the helical flow by the opening. Preferably, the ratio of (a) the distance from the perimeter of the shield to the centre point of the shield, to (b) the distance from the perimeter of the shield to the edge of the opening that is closest to the centre of the shield, at its point closest to the centre of the shield (both distances being measured along the surface of the shield) is not less than about 2, more preferably not less than about 4, especially preferably not less than about 8.

The shape of the face of the shield which is directed away from the upper end of the housing need not necessarily be the inverse shape of the bowl-shaped face. For example, the shape of the face which is directed away the upper end of the housing can be any regular or irregular shape. For example, the shape of the face which is directed away the upper end of the housing can be cuboidal, pyramidal, or part spherical.

The cross-sectional shape of the bowl-shaped face of the shield when the shield is viewed from its side need not necessarily be rounded in shape. The cross-sectional shape of the bowl-shaped face can any shape. For example, the cross-sectional shape of the bowl-shaped face can have the shape of a half-hexagon. For example, the shield can have two pairs of opposing generally planar sides that slope toward each other toward their bottom edges, and a planar bottom extending between the sides. Optionally, the cross-sectional shape of the bowl-shaped face can be generally triangular. For example, the shield can have two pairs of opposing triangular shaped planar sides, which meet at their tips to define an inverted pyramidal-shaped bowl.

Preferably, the bowl-shaped face of the shield curves smoothly to its centre point. However, the bowl-shaped face of the shield need not necessarily curve constantly from its perimeter to its centre point. Accordingly, the cross-sectional shape of the bowl-shaped face of the shield when the shield is viewed from its side need not necessarily be that of a part circle or ellipse, i.e. the shape of the bowl-shaped face need not necessarily be that of an inverted dome. Preferably, the width of the shield decreases monotonically for part way towards its centre point in the sense that the rate at which the width of the shield decreases towards the bottom of the shield is constant, and then progressively decreases for the rest of the way towards its centre point in the sense that the rate at which the width of the shield decreases, increases towards the bottom of the shield. Preferably, part of the cross-sectional shape of the bowl-shaped face of the shield when the shield is viewed from its side is curved and part of the cross-sectional shape is straight. Accordingly, the cross-sectional shape of the bowl-shaped face of the shield can be curved towards its centre, and straight towards its perimeter. In this case, the cross-sectional shape of the bowl-shaped face of the shield will be generally that of a triangle having a rounded tip. Accordingly, the shape of the bowl-shaped face can preferably be that of an inverted cone having a rounded tip. When the cross-sectional shape of the bowl-shaped face of the shield is straight towards its perimeter, preferably the angle between the straight part of the shield and a line extending parallel to an axis extending through and perpendicular to the centre point of the bowl-shaped face, is not more than 70°, more preferably not more than 60°, especially preferably not more than 50°, for example 45°. Preferably the angle between the angle between the straight part of the shield and a line extending parallel to an axis extending through and perpendicular to the centre point of the bowl-shaped face, is not less than 20°, more preferably not less than 30°, especially preferably not less than 40°.

The shape of the shield when viewed from above can be, for example, square or hexagonal. Preferably, the shape of the shield when viewed from above is rotational symmetrical. Preferably, the shield is generally round when viewed from above. It is advantageous to provide a round shaped shield rather than a non-round shaped shield such as a square shaped shield, because non-rounded shaped shields can present edges where liquid droplets could gather and subsequently become re-entrained into the gas stream. Especially preferably, the shield is approximately circular when viewed from above. What is meant by approximately circular is that the shield is sufficiently close to circular so that gas can flow over the shield without disturbing the helical nature of the gas flow. This can help to minimise disturbance to the flow of gas due to discontinuities in the path defined by the shield. Further, it has also been found that a circular shaped shield can provide better acceleration of the helical flow of gas back towards the outlet port over other shaped shields. Both of these factors can result in a smaller pressure drop across the separator assembly.

Preferably, the housing is approximately round, especially approximately circular, in shape when viewed from above. This can help to minimise disturbance of the flow of gas due to discontinuities in the path defined by the housing wall. It has been found that a circular housing can help to maintain the helical flow of gas, thereby maintaining the separating property of helical flow of gas caused by centrifugal force. Further, a circular shaped housing can provide less resistance to a helical gas stream flowing within it. As a result, it has been found that the pressure drop experienced across the separator assembly is less with a circular housing.

Preferably, the ratio of width of the shield to the depth of the shield is at least about 2, more preferably at least about 2.5, especially preferably at least about 2.8, more preferably at least about 3, for example at least about 3.2. Preferably, the ratio of width of the shield to the depth of the shield is not more than about 4, especially preferably not more than about 3.8, more preferably not more than about 3.5, for example not more than about 3.3. The depth of the shield can be measured as being the greatest distance, taken in a straight line, between the plane which contains the perimeter of the shield and the bottom most point on face of the shield that faces towards the upper end of the housing. The width of the shield can be measured as being the greatest distance, taken in a straight line, between two opposing points on the perimeter of the shield. Accordingly, when the shape of the shield is circular when viewed from above, the width can be the diameter of the shield at its perimeter.

Preferably, the separator assembly includes an outlet tube which extends from the inside of the housing to the outlet port, through which gas flows between the inside of the housing and the outlet port. The provision of an outlet tube can isolate the flow of gas which is travelling toward the outlet port and away from the shield, from the flow of gas which is travelling away from the inlet port and toward the shield. This is advantageous as it can prevent the gas flowing away from the shield interfering with the gas flowing toward the shield. This can be important in order to minimise disturbances to the helical flow of the gas, thereby maintaining the separating property caused by the helical flow of the gas, and also thereby minimising the pressure drop across the separator assembly.

Preferably the outlet tube is formed from a polymeric material. Preferred polymeric materials include polyolefins (especially polyethylene and polypropylene), polyesters, polyamides, polycarbonates and the like. Polymeric materials used for the outlet tube can be reinforced, for example by fibrous materials (especially glass fibres or carbon fibres). Materials other than polymeric materials can be used, for example metals.

Preferably the outlet tube is formed by moulding, for example, by injection moulding.

Preferably, the outlet tube is located within the housing against forces as a result of the action against it by the gas stream through engagement between inter-engaging formations provided on the outlet tube and the housing. The inter-engaging formations can be in the form ribs provided on one of the outlet tube and the housing, and grooves provided on the other. Preferably, the ribs are provided on the outlet tube.

When there is provided a shield wall, preferably, the outlet tube is located within the housing against forces as a result of the action against it by the gas stream through engagement between inter-engaging formations provided on the outlet tube and the shield wall. The inter-engaging formations can be in the form of ribs provided on one of the outlet tube and the shield wall, and corresponding grooves into which the ribs can be slidingly received provided on the other. Preferably, the ribs are provided on the outlet tube.

The cross-sectional shape of the outlet tube taken perpendicular to its longitudinal axis can be any regular or irregular shape. Preferably, the cross-sectional shape of the outlet tube is generally rounded. Preferably, the cross-sectional shape of the outlet tube is constant along its length. The size of the cross-sectional shape of the outlet tube need not necessarily be constant along its length. For example, when the cross-sectional shape of the outlet tube is generally rounded, the diameter of the outlet tube can vary along its length.

Preferably, the first flow director is fastened to the outlet tube. The flow director and the outlet tube can be provided as a single piece. For example, the flow director and the outlet tube can be created from a single mould. This can enable easy manufacturing and putting together of the assembly. The flow director and the outlet tube can be provided as separate pieces, which can be fastened together. This can allow different flow directors to be used with different outlet tubes.

If the outlet tube is formed separately from the flow director, then preferably the flow director and the outlet tube are formed form the same material. Preferably, the flow director outlet tube can be fastened to the outlet tube so that it can be subsequently removed. For example, preferably the flow director is fastened to the outlet through the use of a mechanical fastening such as a latch, co-operating screw threads, or engaging bayonet formations. More preferably, the outlet tube and the flow director are shaped and sized so that the outlet tube is held within the flow director by the friction forces between the outlet tube and the flow director.

It can be advantageous in some applications to fasten the flow director to the outlet tube so that the flow director cannot be subsequently removed from the outlet tube. In this case, preferably the flow director is fastened to the outlet tube without the use of a material which is different from the materials of the flow director and outlet tube. For example, preferably, the flow director is fastened to the outlet tube through the use of a welding technique, for example, ultrasonic or heat welding. However, it will be appreciated that the flow director can be fastened to the outlet tube through the use of a third party material such a bonding agent, for example an adhesive.

Preferably, the inlet end of the outlet tube faces toward the bowl-shaped face of the shield. This can help to ensure that gas travelling away from the shield enters the outlet tube. Preferably, an axis extending through the centre of the outlet tube and parallel to the outlet tube at its inlet end, and an axis extending through and perpendicular to the centre point of the bowl-shaped face are coaxial.

Preferably, the flow director comprises a plurality of vanes which are arranged around the axis of the housing and inclined to that axis so that incoming gas is made to follow a generally helical path within the housing, in which the vanes are arranged in an array around the outlet tube.

It has been found that the position of the shield relative to the outlet port and the vanes can affect the efficiency of the assembly. If the shield is located too far away from the outlet port then a significant proportion of gas travelling away from the shield can miss the outlet tube. If the shield is located too close to the outlet port then the advantage of accelerating the cyclone can be reduced. Preferably, the ratio of the distance between the vanes and the bottom most point of the shield on its face that faces towards the upper end of the housing, to the distance between the end of the outlet tube which faces the shield and the bottom most point of the shield on its face that faces towards the upper end of the housing, is at least about 1, more preferably at least about 1.2, especially preferably at least about 1.5, for example at least about 1.7. Preferably, the ratio of the distance between the vanes and the bottom most point of the shield on its face that faces towards the upper end of the housing, to the distance between the end of the outlet tube which faces the shield and the bottom most point of the shield on its face that faces towards the upper end of the housing, is not more than about 2.5, more preferably not more than about 2.2, especially preferably not more than about 2, for example not more than 1.8.

Preferably, the assembly also includes a second flow deflector so that gas flowing into the housing flows over the second flow deflector so that the incoming gas is forced toward the side walls of the housing. Preferably, the second flow deflector is located downstream of the flow director, so that the gas stream flowing into the housing flows over the first flow director first, and then flows over the second flow deflector. Accordingly, preferably, the second flow deflector is located on the side of the first flow director that is distal to the inlet port.

Preferably, the second flow deflector extends annularly around the outlet tube. Preferably, the second flow deflector comprises a ledge portion proximal the second flow director which extends away from the outlet tube, substantially perpendicularly to the axis of the housing. Preferably, the flow conduit further comprises an edge portion which extends away from the free end of the ledge portion, in a direction substantially parallel to the axis of the housing.

Preferably, the second flow deflector is fastened to the outlet tube. The flow deflector and the outlet tube can be provided as a single piece. For example, the second flow deflector and the outlet tube can be created from a single mould. This can enable easy manufacturing and putting together of the assembly. The second flow deflector and the outlet tube can be provided as separate pieces, which can be fastened together. This can allow different flow deflector to be used with different outlet tubes.

If the outlet tube is formed separately from the second flow deflector, then preferably the second flow deflector and the outlet tube are formed form the same material. Preferably, the flow deflector outlet tube can be fastened to the outlet tube so that it can be subsequently removed. For example, preferably the second flow deflector is fastened to the outlet through the use of a mechanical fastening such as a latch, co-operating screw threads, or engaging bayonet formations. More preferably, the outlet tube and the second flow deflector are shaped and sized so that the outlet tube is held within the flow deflector by the friction forces between the outlet tube and the flow deflector.

It can be advantageous in some applications to fasten the second flow deflector to the outlet tube so that the second flow deflector cannot be subsequently removed from the outlet tube. In this case, preferably the flow deflector is fastened to the outlet tube without the use of a material which is different from the materials of the flow director and outlet tube. For example, preferably, the second flow deflector is fastened to the outlet tube through the use of a welding technique, for example, ultrasonic or heat welding. However, it will be appreciated that the second flow deflector can be fastened to the outlet tube through the use of a third party material such a bonding agent, for example an adhesive.

Preferably the second flow deflector is formed from a polymeric material. Preferred polymeric materials include polyolefins (especially polyethylene and polypropylene), polyesters, polyamides, polycarbonates and the like. Polymeric materials used for the second flow deflector can be reinforced, for example by fibrous materials (especially glass fibres or carbon fibres). Materials other than polymeric materials can be used, for example metals.

Preferably the second flow deflector is formed by moulding, for example, by injection moulding.

Preferably, the housing has a head part which provides an upper end of the housing and a body part which provides the lower end of the housing. Preferably, the shield is located within the body part against forces in a direction towards the lower end of the housing as a result of the action against it by the gas stream through engagement between at least one of (a) the edge of the shield and the internal side wall of the housing, and (b) the shield and the base of the housing. This can be advantageous as it is not necessary to use a tie rod extending from the head to secure the shield in the housing. It has been found that by negating the need for a tie rod in the housing, gas flowing through the housing can be subject to less resistance. Accordingly, this can enable the efficiency of the assembly the invention to be enhanced compared with known assemblies. Details of a separator assembly in which the shield is located within the body part against forces in a direction towards the lower end of the housing as a result of the action against it by the gas stream through engagement between at least one of (a) the edge of the shield and the internal side wall of the housing, and (b) the shield and the base of the housing, are disclosed in the application entitled Separator Assembly which is filed with the present application bearing agent's reference P21194WO and claiming priority from UK Patent Application numbers 0515266.5 and 0524181.5. Subject matter that is disclosed in that application is incorporated in the specification of the present application by this reference.

The shield can be located within the body part of the housing through engagement between a plurality of ribs that extend away from its perimeter toward the internal side wall of the housing and the side wall of the housing. The shield and ribs can be one piece. For example, the shield and ribs can be provided as a single moulded piece. Optionally, the shield and ribs can be separate pieces that can be fastened together.

Preferably, there are provided at least three ribs, more preferably at least four ribs, especially preferably at least five ribs, for example six ribs. Preferably, the ribs are arranged so that they are equally spaced around the perimeter of the shield. The ribs can vary in shape and size. This can be advantageous if it is important to locate the shield in a particular orientation within the housing. In this case, the ribs can be shaped and sized so that the shield properly fits within the housing in only one orientation. When the ribs are provided around the perimeter of the shield, preferably the ribs are an extension of the surface of the bowl-shaped face. Accordingly, preferably, the ribs and the surface of the bowl-shaped face provide a continuous surface for gas to flow over. When the cross-sectional shape of the bowl-shaped face of the shield when the shield is viewed from its side is straight towards its perimeter, preferably the ribs extend in the same direction as the perimeter, at the point of the perimeter the ribs extend from. When the cross-sectional shaped of the bowl-shaped face of the shield when the shield is viewed from its side is curved, preferably the ribs extend from the at the perimeter at the same rate of curvature as the shield at its perimeter.

The internal side wall can comprise a plurality of grooves into which the ribs can be slidingly received so as to locate the shield within the body part. Optionally, the width of the interior of the housing can decrease towards its lower end so that the shield is located within the body part by way of a wedge fit between the ribs and the internal side wall.

The shield can be located within the body part of the housing through engagement of the shield with at least one ledge extending at least partially around the internal side wall. For example, the shield could be located within the body part by the contact between the face that faces toward the base of the housing and a ledge on the internal side wall. There can be provided a plurality of ledges spaced around the internal side wall. There can be provided one ledge that extends annularly around the internal side wall.

The engagement between the shield and the housing can be direct engagement. For example, the engagement can be provided by a surface or part of the shield contacting a surface or part of the internal side wall of base of the housing. Optionally, the engagement between the shield and the housing can be indirect. For example, a support can be provided that extends between, and engages both, the housing and the shield. In particular, an upstand support can be provided that extends between the base of the housing and the face of the shield that faces toward the lower end of the housing.

Preferably, the housing includes a drain outlet for material which has been separated from the gas stream. The outlet will generally provide for removal of material which has collected in a reservoir at the lower end of the housing. The drain should preferably be capable of opening without depressurising the housing. A suitable drain mechanism is disclosed in EP-A-81826.

The housing should be formed from a material which is capable of withstanding the internal pressures to which it is subjected when in use. Metals will often be preferred, for example aluminium and alloys thereof, and certain steels.

BRIEF DESCRIPTION OF THE DRAWINGS

Embodiments of the invention will now be described, by way of example only, and with reference to the accompanying drawings, in which.

DETAILED DESCRIPTION OF THE PREFERRED EMBODIMENT

Figure 1:
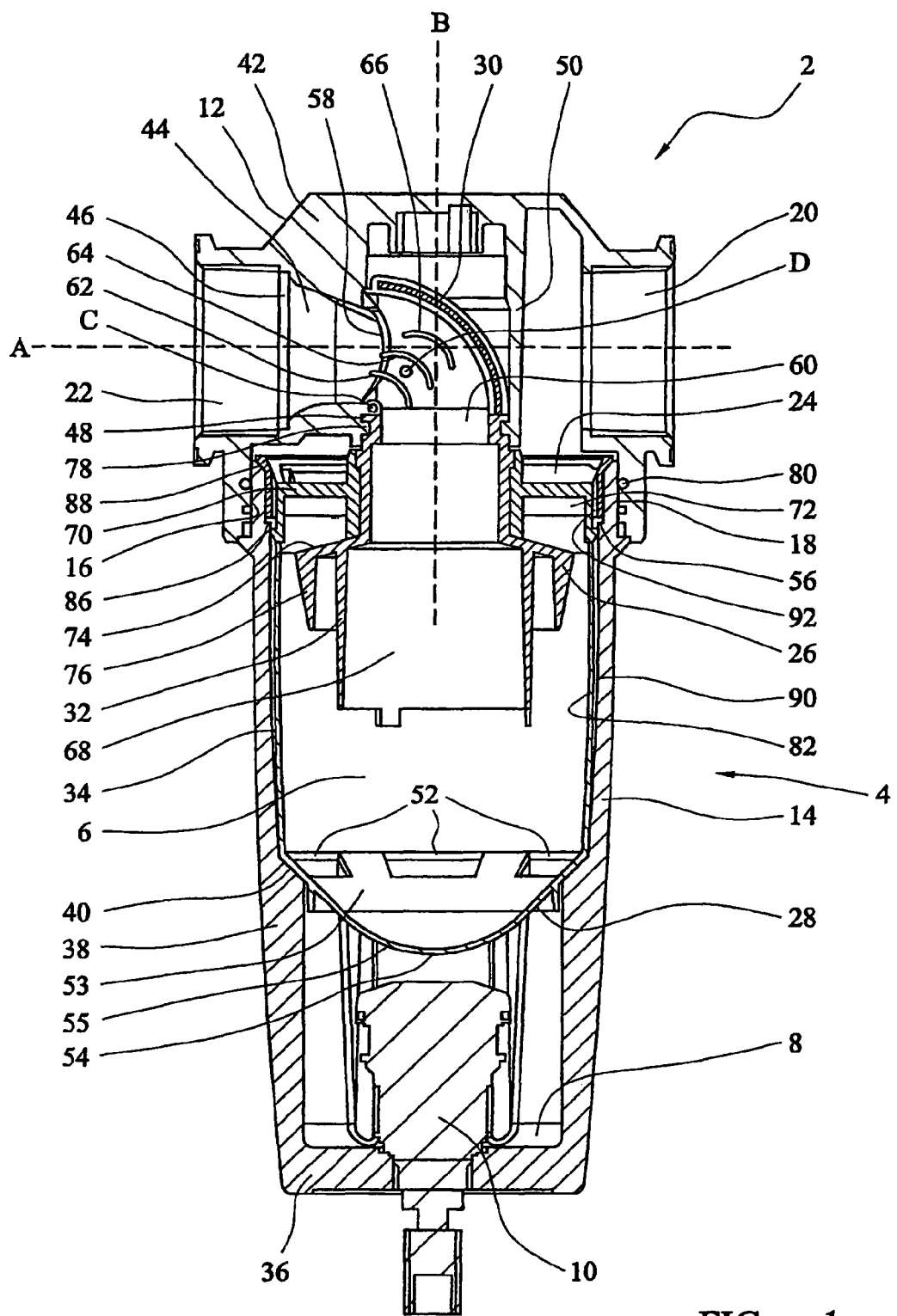
FIG. 1 is a sectional side elevation through a separator assembly according to the present invention.

Referring to the drawings, FIG. 1 shows a separator assembly 2, which comprises a housing 4 defining an inner volume 6. The housing 4 comprises a head part 12, and a body part 14 which can be connected to one another by means of cooperating screw threads at their interfaces 16, 18. The housing 4 further comprises inlet 20 and outlet 22 ports located in the head part 12, for gas to enter and exit the separator assembly 2, a reservoir 8 located at a second end of the housing opposite the first end, and a liquid drainage port 10. The separator assembly further comprises a first flow director 24, a second flow deflector 26, a shield 28, a flow conduit device 30 which includes a conduit portion 32, all located within the body part 14 of the housing 4.

The head part 12 and body part 14 are formed from a metallic material, especially aluminium or an alloy thereof. They can be formed by machining or by techniques such as casting.

The body part 14 comprises a cylindrical wall 34, an end wall 36 at one end of the cylindrical wall 34, and an open end at the opposite end of the cylindrical wall. Liquid separated from a gas stream flowing through the separator assembly is collected in the reservoir 8. The liquid drainage port 10 allows liquid collected in the reservoir 8 to drain from the housing 4. An example of a suitable liquid drainage port 10 is disclosed in EP-A-0081826.

A plurality of fins 38 are provided in the body part 14 towards its second end. The fins 38 extend part way along the cylindrical wall 34 from the second end of the housing toward the first end of the housing, parallel to the axis of the body part. Each fin 38 provides a ledge 40, toward its end proximal the head end of the housing, on which the shield 28 can sit, as described in more detail below.

The head part 12 contains a primary chamber 44 within it having a first end 46 communicating with the outlet port 22 and a second end 48 having an opening communicating with the inner volume 6 of the housing 4 when the separator assembly 2 is assembled. The primary chamber 44 is defined by an internal cylindrical wall 42 extending transversely through within the head part and an internal end wall 50 opposite the outlet port 22.

The shield 28 has a bowl-shaped face 53 and a dome-shaped face 55. The perimeter of the shield 28 is circular in shape. The shield has a plurality of windows 52 cut out of it towards its circumference. The windows 52 allow liquid to pass the shield 28 from the space in the inner volume 6 above the shield to the reservoir 8, as described in more detail below.

Figure 3:
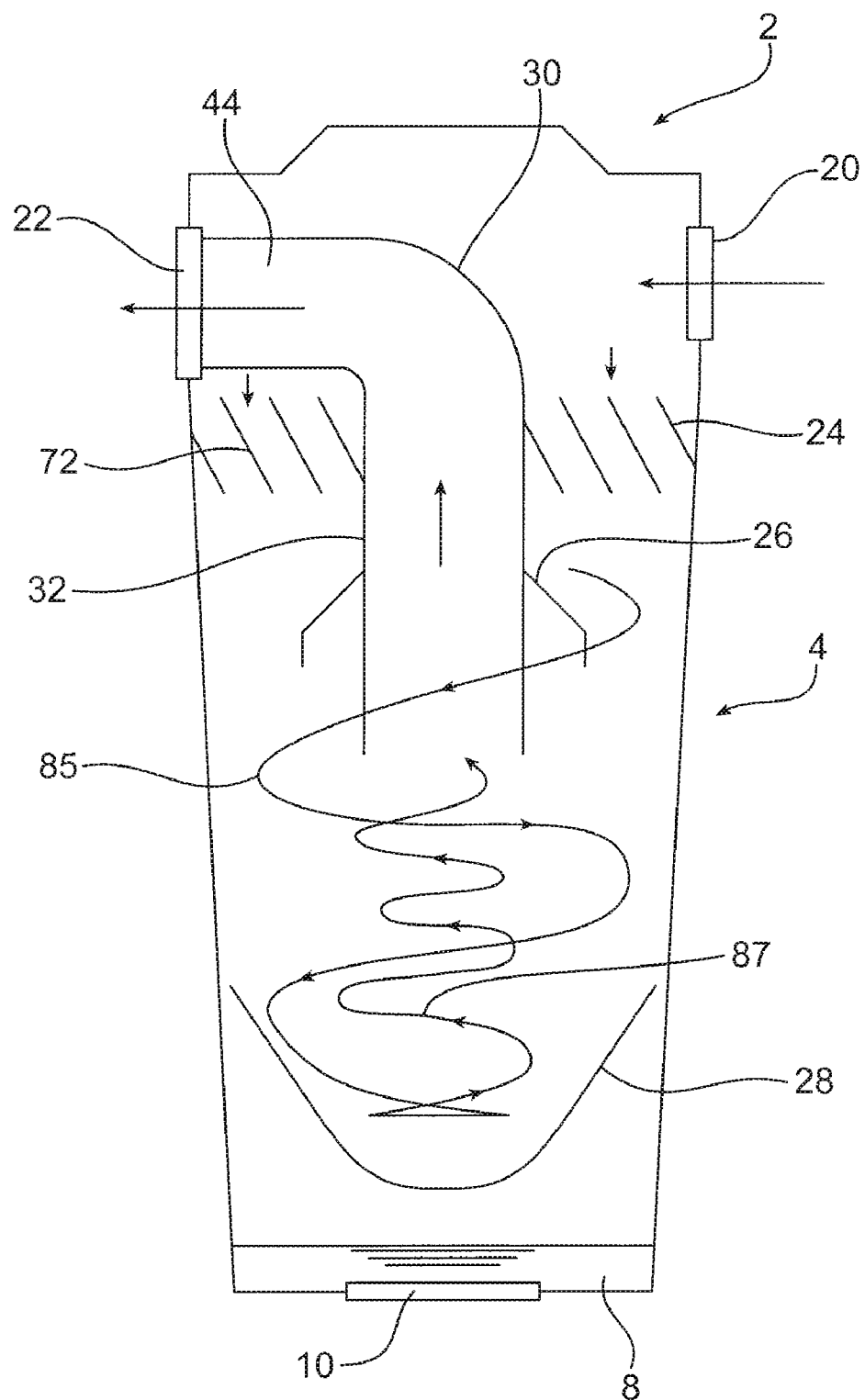
FIG. 3 is a schematic sectional side elevation through the separator assembly shown in FIG. 1, illustrating the flow of gas through the assembly.

The diameter of the shield 28 decreases away from its perimeter towards its centre point 54. The diameter of the shield 28 decreases monotonically for part way towards its centre point, and then progressively decreases for the rest of the way towards its centre point. Therefore, when taken in cross-section as shown in FIGS. 1, 3 and 4, the faces of the shield define a rounded V-shape, having straight edges 96 towards its ends 98 and a rounded bottom towards its centre point 54.

Figure 4:
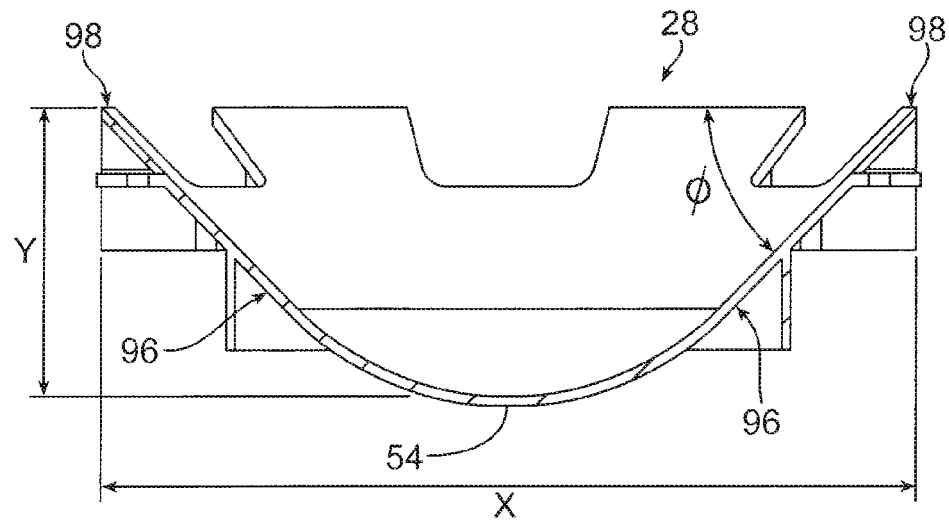
FIG. 4 is a sectional side elevation through the shield of the separator assembly shown in FIG. 1.
Figure 5:
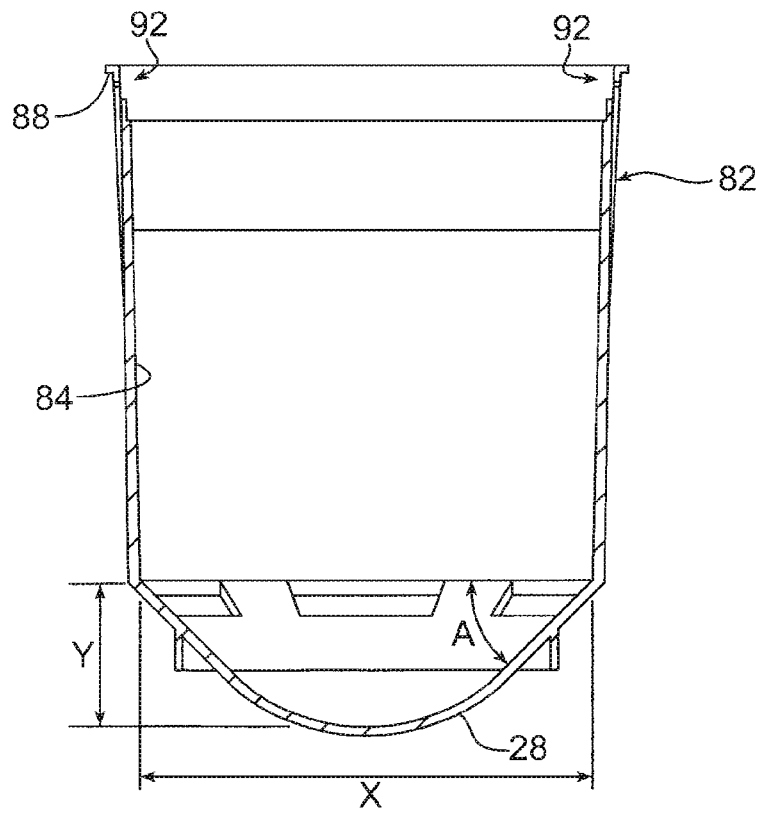
FIG. 5 is a sectional side elevation through the shield and the shield wall of the separator assembly shown in FIG. 1.

As best shown in FIG. 4, the angle Ø between the straight edges 96 of the shield and the plane in which the perimeter of the shield lies, is approximately 45°. Further, the ratio of the diameter X of the shield 28 to the depth Y of the shield 28 is approximately 2.8.

The shield 28 is formed from a polymeric material, such as nylon. It can be formed by techniques such as injection moulding.

A shield wall 82 is provided that extends around the circumference of the shield 28. The shield wall 82 extends from the shield 28 to an open end proximal the open end of the housing body part 14. The shield wall 82 is generally cylindrical in shape, and is a snug fit within the housing body part 14. The surface of the inner side 84 of the shield wall 82 is rough in texture. The open end of the shield wall 82 comprises an annularly extending lip 88. When assembled, the 88 lip rests on the open end of the housing body part 14 as described in more detail below.

Figure 2:
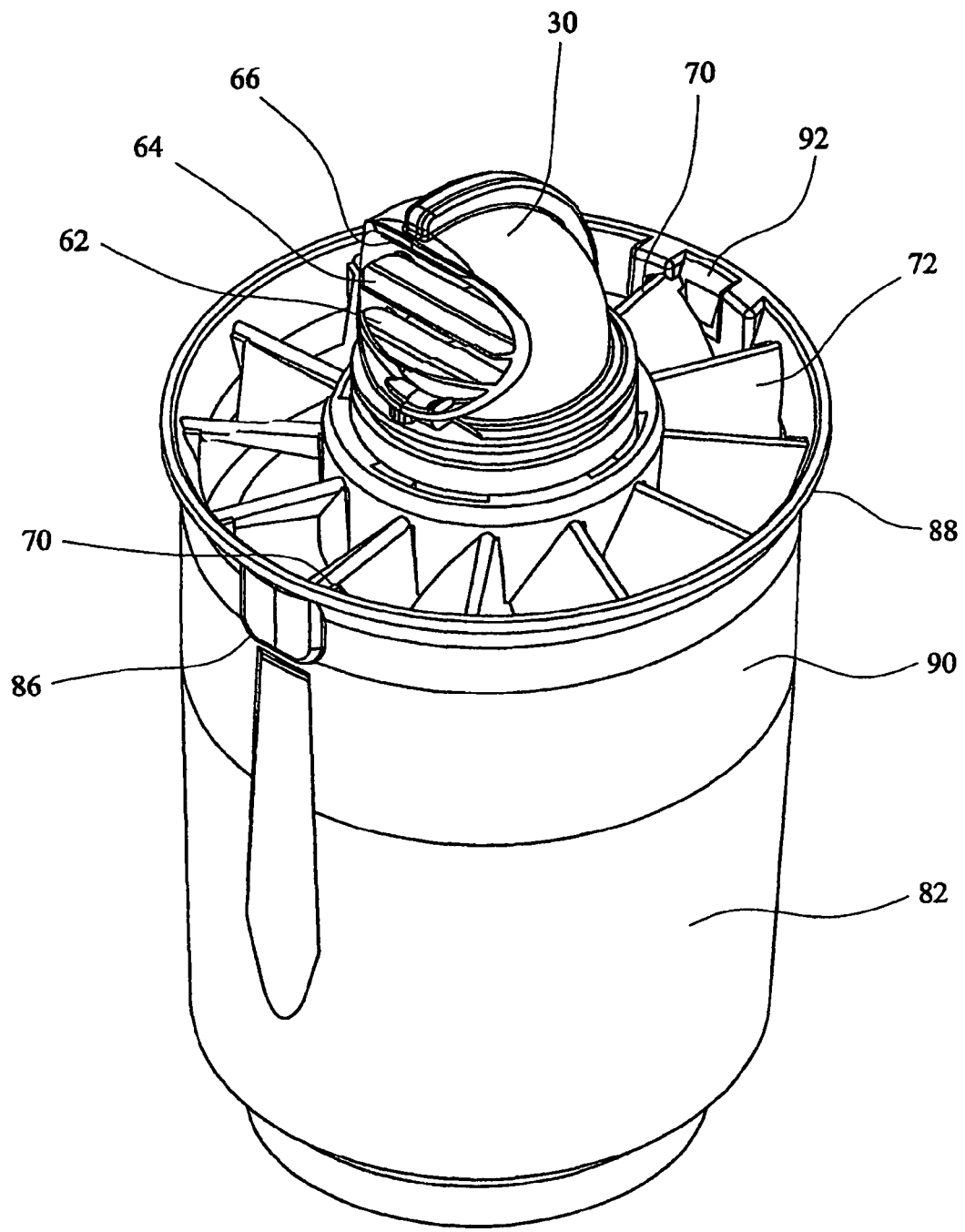
FIG. 2 is perspective view of the separator assembly shown in FIG. 1, without the housing.
Figure 6:
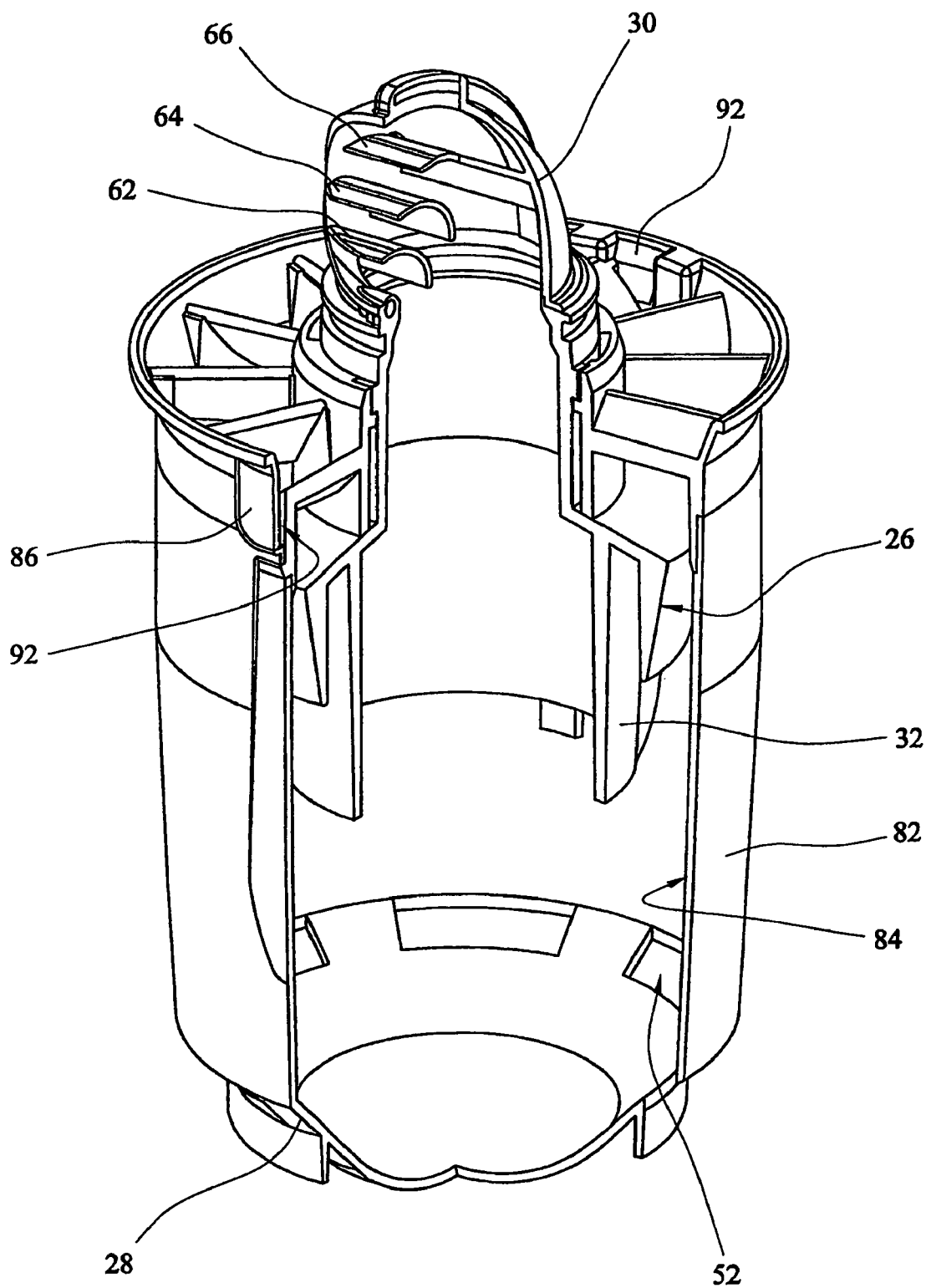
FIG. 6 is a cut-away perspective view of the separator assembly shown in FIG. 1, without the housing.

A plurality of grooves 92 are provided around the inner side 84 of the shield wall 82 at its open end for receiving ribs 70 of the flow conduit device 30 as described in more detail below. In the embodiment shown, two grooves 92 are spaced 180° around the open end of the shield wall 82. As best shown in FIGS. 2 and 6, there are also provided ribs 86 spaced around the outer side 90 of the open end of the shield wall 82. In the embodiment shown, the grooves 92 also act as the ribs 86, and therefore there are provided two ribs 86 that are spaced 180° around the open end of the shield wall 82. When assembled, the ribs 86 are slidingly received within corresponding grooves 56 in the cylindrical wall 34 of the housing body part 14.

The flow conduit device 30 has a first opening 58 that is directed towards the outlet port 22 and has a first axis A, and a second opening 60 that is directed toward the body part 14 of the housing and has a second axis B. The angle between the axes A, B of the first 58 and second 60 openings is 90°. The flow conduit device 30 provides a continuous flow path between the two openings, and therefore provides a smooth change of direction for gas flowing through it when in use. The flow conduit device 30 turns about an axis C which extends perpendicularly to the axes A, B of the first 58 and second 60 openings. (As shown in FIG. 1, the axis C extends perpendicularly to the plane along which the cross-section of the separator assembly 2 is taken).

An 0-ring 78 is provided around the flow conduit device 30, within an annular recess that extends around the external surface of the flow conduit device at its second opening 60 end. The flow conduit device 30 contains first 62, second 64 and third 66 curved vanes extending perpendicularly across the flow conduit device 34. Each vane 62, 64, 66 curves around its own axis and the radius of curvature is the same for each vane. Further, the length of the vanes 62, 64, 66, measured between their leading and trailing edges, is the same for each vane. The axes around which the vanes 62, 64, 66 curve extend parallel to the axis C around which the flow conduit device 30 curves. For example, the second vane 64 curves around an axis D. The vanes 62, 64, 66 each have concave and convex surfaces, wherein the concave surface of each vane faces the first 58 and second 60 openings of the flow conduit device 30. Accordingly, the vanes 62, 64, 66 help guide the flow of gas between the first 58 and second 60 openings.

The flow conduit device 30 further includes a conduit portion 32 which, when the separator assembly 2 is assembled, extends into the housing body part 14. In this embodiment, the flow conduit device 30 and the conduit portion 32 are one piece. However, it will be appreciated that they need not be one piece. The conduit portion 32 defines a flow path 68 for gas leaving the inner volume 6 and is in fluid communication with the second opening 60 of the flow conduit device 30. The walls of the conduit portion 32 are cylindrical. The diameter of the conduit portion 32 is narrower towards its end proximal the second opening 60.

The flow director 24 comprises plurality of baffles 72 provided around the conduit portion 32. When the flow conduit device 30 is located within the housing body part 14, the baffles 72 extend between the conduit portion 32 and the inner side of the cylindrical wall 34 of the body part. The baffles are rectangular in shape and are arranged so that their planar faces extend at an angle to the longitudinal axis of the housing body part 14 when the flow conduit device 30 is located in the body part 14.

The flow conduit device 30 further comprises a plurality of ribs 70 that extend away from the conduit portion 32 at its end proximal the second opening 60. The ribs 70 can slide into the grooves 92 in the shield wall 28 in order to hold the flow conduit device 30 within body part 14. In the embodiment shown two ribs 70 are provided spaced 180° around the conduit portion 32. Also in the embodiment shown, each of the ribs 70 is also a baffle 72. However, it will be appreciated that the ribs 70 can have a different configuration to the baffles 72 and therefore not be baffles.

The flow deflector 26 extends annularly around the conduit portion 32, and is shaped and sized so that it extends away from the conduit portion part way toward the inner side of the shield wall 82, when the flow conduit device 30 is located in the body part. The flow deflector 26 is located on the side of the baffles 72 distal to the second end 62 of the flow conduit device 30. The flow deflector 26 comprises a ledge portion 74 proximal the baffles 72 which extends away from the conduit portion 32, substantially perpendicularly to the axis of the conduit portion 32, and an side skirt 76 which extends away from the end of the ledge portion, substantially parallel to the axis of the conduit portion.

The flow conduit device 30 is formed from a polymeric material, for example nylon. The flow conduit device 30 can be formed by techniques such as injection moulding. The different parts of the flow conduit device 30, such as the conduit portion 32, the ribs 70, the flow director 24 and the flow deflector 26 can be formed together as one piece, as different pieces, or as a combination of single and different pieces (i.e. the conduit portion 32 and the flow deflector 26 can be formed as one piece and the flow director 24 as a separate piece subsequently fastened to the conduit portion).

The separator assembly 2 is assembled by locating the shield 28 and shield wall 82 in the housing body part 14 by sliding them through the body part until the portions between the windows 52 of the dome-shaped face 55 of the shield 28 rest on the ledges 40 of the fins 38, and until the ribs 86 are received within the grooves 56 in the cylindrical side wall 34 of the housing body part 14. Once the ribs 86 have been fully received by the grooves 56, the shield 28 and shield wall 82 are securely suspended within the housing body part 14, and the lip 88 should rest on the open end of the housing body part 14. The shield 28 and shield wall 82 are then securely suspended within the housing body part 14, and rotation of the shield 28 and shield wall 82 within the housing body part 14 is restricted by the interlocking of the ribs 86 with the grooves 56.

The flow conduit device 30 is then located in the housing body part 14 by sliding the ribs 70 into the grooves 92 until they sit on the bottom of the grooves. Once the ribs 70 have been fully received by the grooves 92, the flow conduit device 30 is securely suspended within the housing body part 14. Therefore, the axial position of the flow conduit device 30 within the housing body part 14 can be controlled by the shape and size of the ribs 70 and the grooves 92. Further, rotation of the flow conduit device 30 is prevented by the interlocking of the ribs 70 with the grooves 92. The flow conduit device 30 can be removed from the housing body part 14 by pulling the flow conduit device away from the body part along its axis.

The housing head part 12 is secured to the housing body part 14 by locating the flow conduit device 30 in the primary chamber 44 of the head part through the opening at the primary chamber's second end 48. The O-ring 78 is received by the opening, and is compressed by the walls of the primary chamber 44 to form a fluid tight seal.

The housing head part 12 and body part 14 are secured by rotating one relative to the other so that their cooperating screw threads at their interfaces 16, 18 are tightened to interlock with each other. An O-ring 80 is provided at the interfaces 16, 18 which is compressed by the interfaces to form a fluid tight seal. When assembled, the inlet port 20 is in fluid communication with an inner volume 6 of the housing 4.

The separator assembly 2 can be disassembled by rotating the housing head part 12 and body part 14 relative to each other so that their cooperating screw threads are loosened. Any rotational force that is imparted on the flow conduit device 30 by frictional and related forces (for example arising from physical or chemical interactions or both) between the O-ring 78 on the flow conduit device and the primary chamber 44 of the head part 12 is negated by the opposite rotational drive that is provided by the ribs 70 acting against the grooves 92 in the shield wall 28. Therefore, as the housing head part 12 and body part 14 are rotated relative to each other, the flow conduit device 30 will tend to reside in the body part rather than be drawn away from the body part with the head part. Accordingly, when the head part 12 and the body part 14 are separated from each other, the flow conduit device 30 will remain located within the body part 14.

In use, the separator assembly is used in a substantially vertical position, with the housing head part 12 being above the body part 14. A gas having an entrained material that is to be removed from the gas enters the separator assembly through the inlet port 20. In the embodiment described, the gas is air and the material is water. The air flows away from the inlet port 20, and passes over the baffles 72 of the flow director 24. The configuration and arrangement of the baffles 72 impart a helical flow to the gas stream as illustrated by line 85. Once the gas has passed through the flow director 24, over the baffles 72, the gas then flows over the flow deflector 26. The configuration and arrangement of the flow deflector 26 forces the gas to flow outwards towards the shield wall 28.

Due to the water entrained in the gas being heavier than the gas, the water is pushed outward towards the shield wall 82 as the gas stream spins in a helical manner. This is due to the centrifugal force on the water as the gas/water mixture turns. The water then falls down the inner side 84 of the shield wall 82, passes past the shield 28 through the windows 52, and collects in the reservoir 8 at the bottom of the housing body part 14. The water can be drained from the reservoir 8 by operating the liquid drainage port 10.

The gas continues to travel away from the inlet port 20 in a helical motion, until it reaches the shield 28. At this point, the gas is reflected off the shield 28 back toward the housing head part 12, as illustrated by line 87. Due to the bowl-shape of the shield 28, the helical flow of the gas stream is maintained. Further, the shield acts to accelerate the helical flow of gas toward the conduit portion 32 of the flow conduit device 30.

The shield 28 acts as a barrier to the gas flowing past it. The turbulence in the volume of gas in the area below the shield 28, i.e. between it and the housing body part's 14 end wall 36, is less than the turbulence in the volume of gas above the shield. Accordingly, the space between the shield 28 and the housing body part's 14 end wall 36 is known as a "quiet space".

The gas stream then passes through the conduit portion 32, the flow conduit device 30, and finally through the primary chamber 44 before being discharged from the separator assembly 2 by the outlet port 22. The smooth change of direction provided by the flow conduit device 30, and also the vanes 62, 64, 66, help to turn the gas as it passes through the flow conduit device. This helps to reduce turbulence in the flow conduit device 30 and thereby helps to reduce the drop in pressure across the flow conduit device caused by the change of direction.

What is claimed is:

1. A separator assembly for removing material that is entrained in a gas stream comprising:
   a. a housing having inlet and outlet ports for the gas from which material is to be removed, the inlet and outlet ports being located toward the upper end of the housing, and having a flow director positioned so that gas flowing into the housing flows over the flow director so that the incoming gas is made to follow a generally helical path within the housing; and
   b. a shield which extends across the housing towards the lower end thereof so as to leave a collection space between it and the lower end in which material that is separated from the gas stream can collect, with at least one opening in or around the shield through which the material can flow past the shield into the collection space, in which the face of the shield which is directed towards the upper end of the housing is bowl-shaped when the shield is viewed in cross-section from one side, and wherein the part of the cross-sectional shape of the shield which is closest to its perimeter is straight, and the cross-sectional shape of the shield curves smoothly in the concave sense to its center point so that the shape of the face is the inverse of an inverted cone with a rounded tip.

2. A separator assembly as claimed in claim 1, wherein the housing is approximately circular when viewed from above, and in which ratio of diameter of the shield to the depth of the shield is at least about 2.8.

3. A separator assembly as claimed in claim 1, which includes an outlet tube which extends from the inside of the housing to the outlet port, through which gas flows between the inside of the housing and the outlet port.

4. A separator assembly as claimed in claim 3, in which the flow director is fastened to the outlet tube.

5. A separator assembly as claimed in claim 3, in which the inlet end of the outlet tube faces toward the bowl-shaped face of the shield.

6. A separator assembly as claimed in claim 5, in which the flow director comprises a plurality of vanes which are arranged around the axis of the housing and inclined to that axis so that incoming gas is made to follow a generally helical path within the housing, in which the vanes are arranged in an array around the outlet tube.

7. A separator assembly as claimed in claim 6, in which the ratio of the distance between the vanes and the bottom of the shield to the distance between the end of the outlet tube which faces the shield and the bottom of the shield is at least about 1.5.

8. A separator assembly as claimed in claim 1, in which the shield comprises a wall extending around its perimeter on its face which is directed toward the upper end of the housing.

9. A separator assembly as claimed in claim 8, in which the texture of the surface of the inner side wall of the shield wall is rough.

10. A separator assembly as claimed in claim 8, in which the housing has a head part which provides the upper end of the housing and a body part which provides the lower end of the housing, and in which the wall extends from the shield to a point proximal the upper end of the body part.

11. A separator assembly as claimed in claim 8, in which the shield is located within the body part of the housing against forces in a direction towards the lower end of the housing as a result of the action against it by the gas stream through engagement between the wall of the shield and an internal side wall of the housing.

12. A separator assembly as claimed in claim 1, in which the bowl-shaped face of the shield includes a plurality of windows toward its circumference to allow material to pass through the shield into the collection space, and has a continuous, uninterrupted central curved portion.

13. A separator assembly for removing material that is entrained in a fluid stream, comprising:
   a. a housing having inlet and outlet ports for the fluid from which material is to be removed, the inlet and outlet ports being located toward the upper end of the housing, and having a flow director positioned so that fluid flowing into the housing flows over the flow director so that the incoming fluid is made to follow a generally helical path within the housing; and
   b. a shield which extends across the housing towards the lower end thereof so as to leave a collection space between it and the lower end in which material that is separated from the fluid stream can collect, with at least one opening in or around the shield through which the material can flow past the shield into the collection space, in which the face of the shield which is directed towards the upper end of the housing is bowl-shaped when the shield is viewed in cross-section from one side, and wherein the part of the cross-sectional shape of the shield which is closest to its perimeter is straight, and the cross-sectional shape of the shield curves smoothly in the concave sense to its center point so that the shape of the face is the inverse of an inverted cone with a rounded tip.

14. A separator assembly as claimed in claim 13, in which the shield is located within the body part of the housing against forces in a direction towards the lower end of the housing as a result of the action against it by the fluid stream through engagement between the wall of the shield and an internal side wall of the housing.

15. A separator assembly as claimed in claim 13, in which the bowl-shaped face of the shield includes a plurality of windows toward its circumference to allow material to pass through the shield into the collection space, and has a continuous, uninterrupted central curved portion.

16. A separator assembly for removing material that is entrained in a gas stream comprising:
   a. a housing having inlet and outlet ports for the gas from which material is to be removed, the inlet and outlet ports being located toward the upper end of the housing, and having a flow director positioned so that gas flowing into the housing flows over the flow director so that the incoming gas is made to follow a generally helical path within the housing; and
   b. a shield which extends across the housing towards the lower end thereof so as to leave a collection space between it and the lower end in which material that is separated from the gas stream can collect, with at least one opening in or around the shield through which the material can flow past the shield into the collection space, in which the face of the shield which is directed towards the upper end of the housing has a concave bowl shape with i) straight, conical sidewalls from the outer distal periphery of the shield and ii) a rounded central portion which curves smoothly from the sidewalls to the center point of the shield such that helical fluid flow reflected from the shield maintains a helical flow directed toward the outlet port.

17. A separator assembly as claimed in claim 16, in which the shield is located within the body part of the housing against forces in a direction towards the lower end of the housing as a result of the action against it by the fluid stream through engagement between the wall of the shield and an internal side wall of the housing.

18. A separator assembly as claimed in claim 16, in which the bowl-shaped face of the shield includes a plurality of windows toward its circumference to allow material to pass through the shield into the collection space, and has a continuous, uninterrupted central curved portion.

* * * * *